(12) United States Patent
Moreton (10) Patent No.: US 7,450,136 B1
(45) Date of Patent: Nov. 11, 2008

(54) APPARATUS AND SYSTEM FOR GENERATING TEXTURE DERIVATIVES FOR PIXEL PROCESSING

(75) Inventor: Henry Packard Moreton, Woodside, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 11/313,192

(22) Filed: Dec. 19, 2005

(51) Int. Cl.
*G09G 5/00* (2006.01)
(52) U.S. Cl. ...................... 345/611; 345/582
(58) Field of Classification Search ............... 345/582, 345/611
See application file for complete search history.

(56) References Cited

U.S. PATENT DOCUMENTS

| | | | |
|---|---|---|---|
| 6,633,297 B2 * | 10/2003 | McCormack et al. | 345/506 |
| 6,636,232 B2 * | 10/2003 | Larson | 345/611 |
| 2004/0066388 A1 * | 4/2004 | Leather et al. | 345/611 |
| 2004/0174360 A1 * | 9/2004 | Deering et al. | 345/426 |

* cited by examiner

*Primary Examiner*—Kee M Tung
*Assistant Examiner*—Jacinta Crawford
(74) *Attorney, Agent, or Firm*—Cooley Godward Kronish LLP (57) ABSTRACT

A pixel processing unit reduces the number of pixels exterior to a primitive that must be rendered solely for the purpose of generating texture derivative information required to shade pixels within the primitive. In one embodiment, the alignment of group footprints is selected to reduce pixels exterior to primitives which must be calculated to generate texture derivatives. In another embodiment pairs of primitives from the same graphical surface sharing a common boundary are coalesced and shaded concurrently.

14 Claims, 6 Drawing Sheets

APPARATUS AND SYSTEM FOR GENERATING TEXTURE DERIVATIVES FOR PIXEL PROCESSING

FIELD OF THE INVENTION

The present invention is generally related to pixel shaders in graphics systems. More particularly, the present invention is directed towards pixel shaders in which a pixel shading operation requires the calculation of a texture derivative.

BACKGROUND OF THE INVENTION

Conventionally, a graphics surface is divided into smaller primitives (e.g., triangles). The primitives are rasterized and other operations are performed to generate pixels for visible portions of primitives. Individual pixels are also shaded to generate the pixel color, generate transparencies, and perform other effects.

A graphics pipeline typically includes a pixel shader to shade pixels. A pixel shader converts a set of texture coordinates into a color using a shader program. Textures conventionally have horizontal and vertical texture coordinates mapped to an (s, t) space using a plane equation. The pixel shading may, for example, be performed using parallel processing units.

Note that in a conventional pixel shading paradigm the shading of primitives is performed largely independent of one another. This permits the processing work to be distributed amongst parallel shading elements until all of the primitives of a frame are shaded. Thus, in a conventional shading paradigm a first primitive is shaded, then another, and so on until all of the primitives of the frame are shaded. One aspect of this shading paradigm is that typically intermediate calculations used to shade pixels of individual primitives are not retained after a particular primitive is shaded.

In addition to performing texture operations to calculate a pixel color, a pixel shader may also perform filtering operations that require calculating an estimate of texture derivatives with respect to neighboring pixels. The derivatives are estimated based on differences in texture values with respect to a neighboring pixel. The texture values may, for example, be calculated at pixel centers in a pixel "footprint" about the pixel being shaded. As one example, the footprint may be a group of four pixels (a "quad") including the pixel being shaded. Thus, a common algorithm for shading an individual pixel is to select a footprint of pixels about the pixel, determine the texture value at pixel centers in the footprint about the pixel being shaded using an appropriate plane equation, and utilize difference equations to estimate texture derivatives for filtering the pixel being shaded.

A problem with conventional pixel shaders is that the efficiency of the shading process tends to decrease as the triangle size shrinks. This decrease in efficiency with decreasing triangle size is caused by the need to calculate neighboring exterior pixels outside of a triangle solely for the purpose of estimating texture derivatives for interior edge pixels of the triangle. As previously described, once a particular triangle is shaded typically the intermediate calculations used to shade the triangle are not retained. As a result, triangles with a high perimeter-to-area ratio will require a significant number of exterior pixels per interior pixel to be calculated solely for estimating texture derivatives. This is a particular concern when the derivatives of the texture coordinates are the result of a long chain of calculations such that the entire shader program must be executed.

Figure 1:
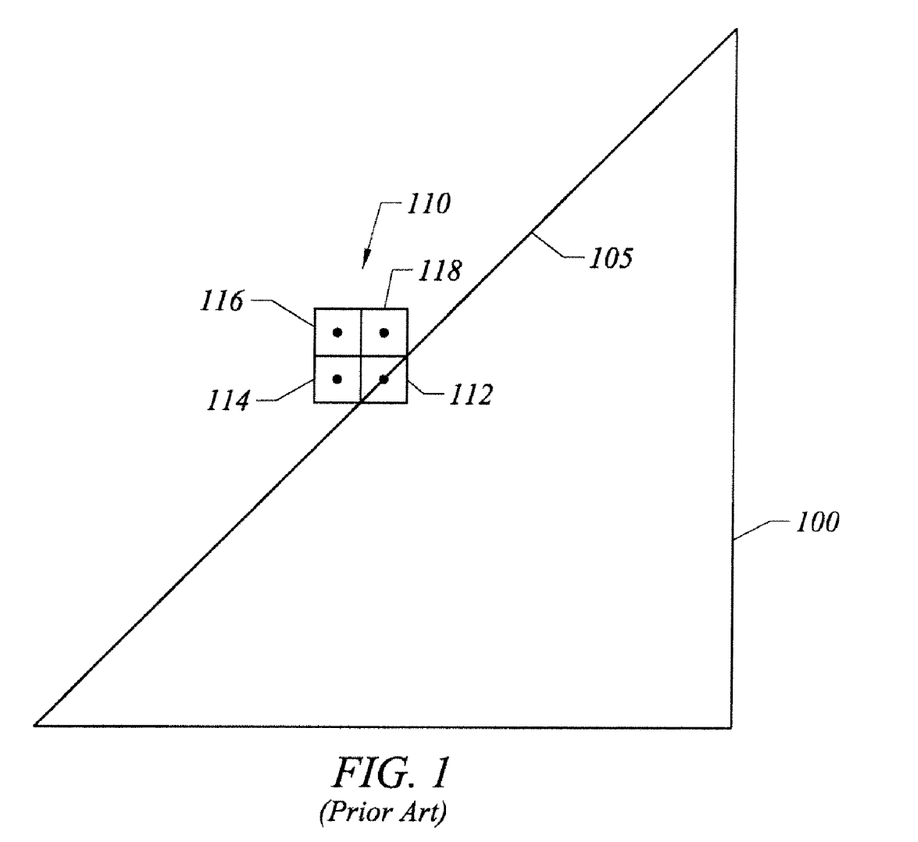
FIG. 1 illustrates a first example of derivative calculation for shading a pixel of a first primitive in accordance with the prior art.
Figure 2:
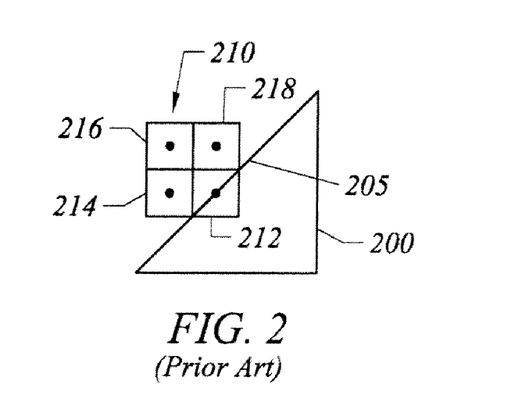
FIG. 2 illustrates a second example of a derivative calculation for shading a pixel of a second primitive in accordance with the prior art.

FIG. 1 illustrates a primitive 100 which is to be shaded. An individual pixel 112 has a pixel center within primitive 100 proximate edge 105 such that pixel 112 will be shaded. In order to calculate texture derivatives for pixel 112, texture values for other pixels 114, 116, and 118 outside of primitive 100 must be calculated as part of a group derivative footprint 110, such as a quad of four pixels. Thus, for a pixel 112 to be shaded, the other pixels 114, 116, and 118 within the group footprint 110 must also be rendered to generate derivative information. For a comparatively large primitive 100 this may not be a concern since the perimeter-to-area ratio is low. However, referring to FIG. 2, for a comparatively small primitive 200, the perimeter-to-area ratio increases. As a result, a large percentage of the pixels will be edge pixels, such as a pixel 212 near edge 205, increasing the fraction of exterior pixels that must be calculated for the sole purpose of generating derivative information. For example, exterior pixels 214, 216, and 218 of quad 210 must be rendered to generate texture derivatives for pixel 212. It can be understood from comparing FIGS. 1 and 2 that as the triangle size shrinks the computational resources required to calculate texture derivatives increases.

There is an increasing interest in performing graphics processing of complex surfaces. Complex surfaces are best processed by dividing the surface into comparatively small primitives (triangles). However, as previously described, this may result in a large increase in the computational resources that must be devoted to calculating texture derivatives.

In light of the above-described problems, the apparatus and system of the present invention was developed.

SUMMARY OF THE INVENTION

A pixel processing apparatus generates texture derivatives to shade individual pixels of primitives. A pixel shader performs at least one pixel shading operation in which each pixel of a selected primitive that is shaded requires a group footprint of neighboring pixels about a pixel being shaded to be rendered. The group footprint is used to generate derivative information for the pixel being shaded. The pixel processing apparatus has a mode of operation in which a shading process is organized to reduce the number of pixels in each group footprint extending outside of the selected primitive that must be rendered for the sole purpose of generating derivative information for pixels having a pixel center interior to the selected primitive. In one embodiment, an alignment of the group footprint is selected to reduce the number of pixels exterior to the primitive that must be rendered to generate derivative information. In another embodiment, adjacent primitives from the same graphical surface are identified and pairs of adjacent primitives are coalesced. A coalesce group permits a group footprint to straddle a common boundary between a pair of primitives. As a result, pixels rendered for one primitive may also be used to generate derivative information for the other primitive of the pair.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 3:
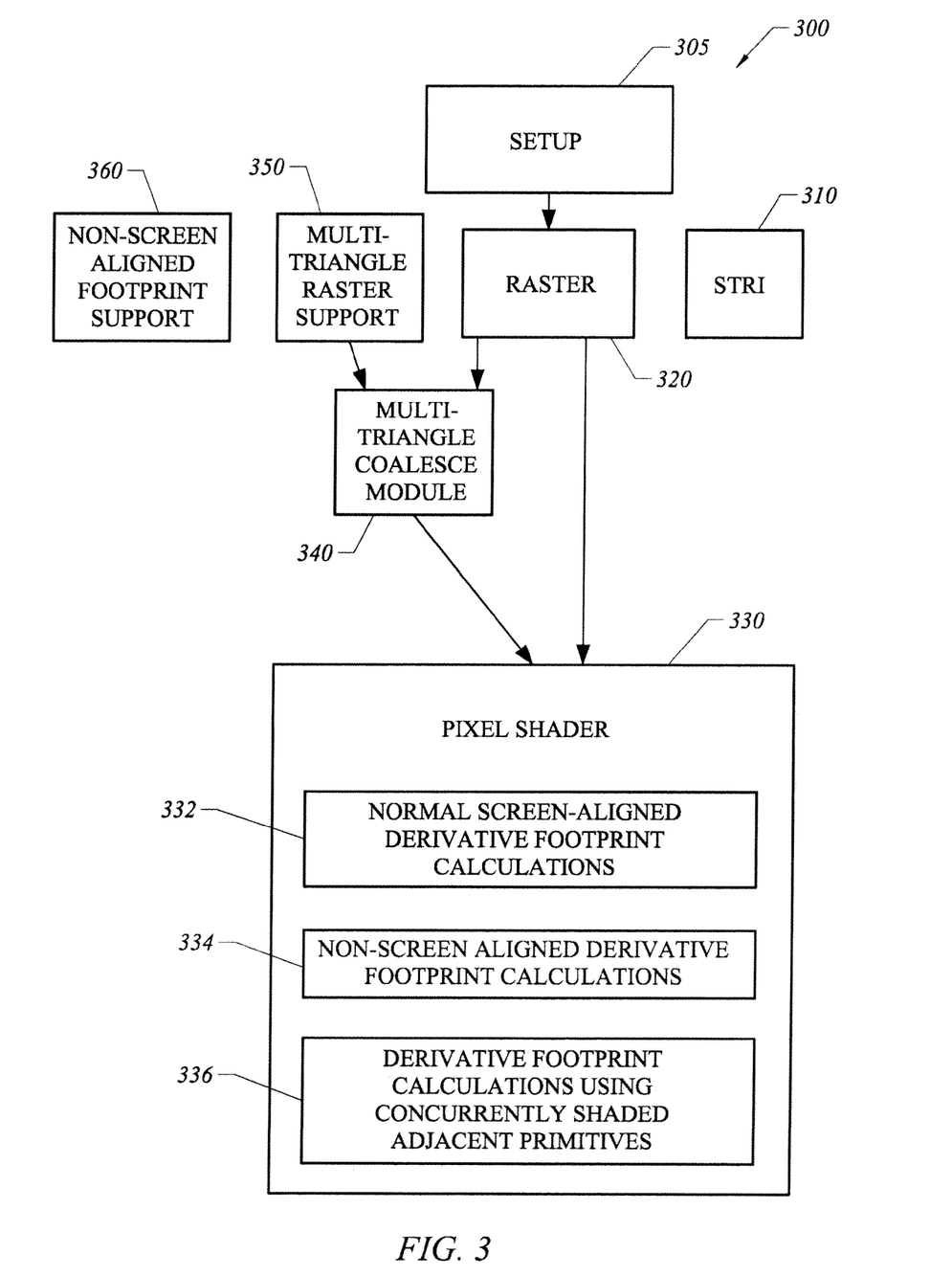
FIG. 3 illustrates a pixel processing apparatus in accordance with one embodiment of the present invention.

FIG. 3 illustrates a pixel processing unit 300 for shading pixels of primitives in accordance with one embodiment of the present invention. In the following discussion, triangles are described as exemplary primitives requiring pixel processing. However, it will be understood throughout the following discussion that other types of primitives may also be processed by pixel processing unit 300. However, triangles are the most common type of primitive.

Pixel processing unit 300 includes a triangle setup unit 305, triangle plane equation (STRI) unit 310, raster stage 320, and a pixel shader 330. Shaded pixels are output to a raster operations (ROP) stage (not shown) and may, for example, be stored in a frame buffer (not shown). Registers (not shown) may be utilized to temporarily store data during data processing operations. Pixel processing unit 300 may also be implemented as a parallel architecture having parallel pixel shaders 330

Pixel processing unit 300 performs pixel shading operations to determine the color of individual pixels of triangles. In one embodiment at least one pixel processing operation requires estimates of texture derivatives. If, for example, a texture (s, t) maps to a texture via texture coordinates (s, t) then estimates of derivatives in (s, t) coordinates are required. As an illustrative example, the texture derivative may be required to perform a filtering operation. The derivative is estimated from a difference equation using values of textures at neighboring pixels within a derivative footprint. The derivative footprint, may, for example, be a quad group of four pixels.

In one embodiment, pixel shader 330 includes a normal screen aligned derivative footprint calculation module 332, a non-screen aligned derivative footprint calculation module 334, and an adjacent primitive derivative footprint calculation module 336. The different modes for calculating texture derivatives are supported by other elements of pixel processing unit 300. A non-screen-aligned footprint support module 360 supports adjusting the derivative footprint of pixels to reduce the number of pixels exterior to a triangle that are required to calculate derivatives. A multi-triangle coalesce module 340 is provided to coalesce neighboring adjacent triangles that are generated from the same surface, face the same direction, are non-overlapping, and share a common boundary. As described below in more detail, the coalescing of triangles generated from the same surface reduces the number of calculations that must be performed to generate derivative information. A multi-triangle raster support module 350 supports rasterizing neighboring triangles of the same surface concurrently.

In one embodiment, non-screen-aligned footprint support module 360 determines whether a shift in derivative footprint alignment reduces the number of pixels exterior to a primitive that must be rendered to generate derivative information. The derivative footprint alignment that results in the smallest computational effort is then selected. As one example, the alignment can be shifted from an alignment in which the derivative footprint is centered on odd pixels to even pixels. However, more generally, the derivative footprint may be aligned with respect to an individual triangle to achieve the greatest reduction in the number of exterior pixels that must be calculated to generate derivative information for interior pixels.

Figure 4:
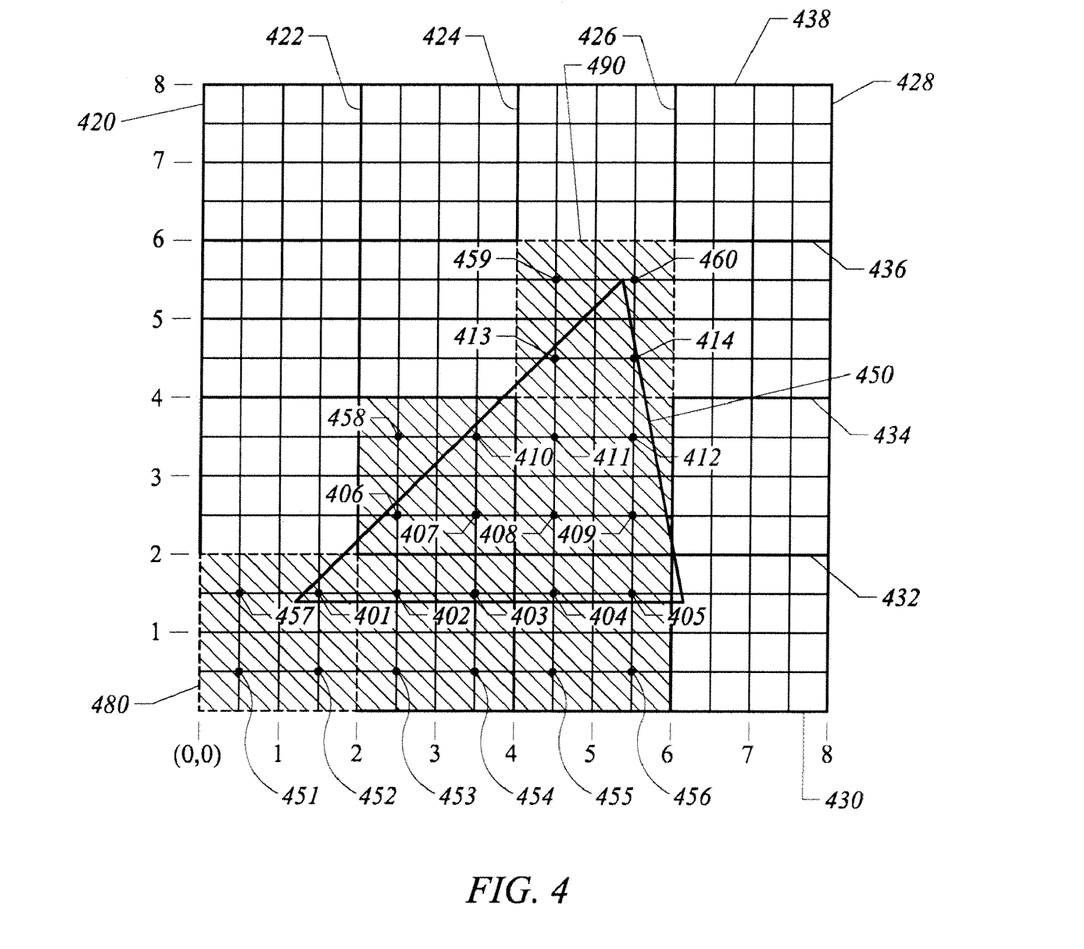
FIG. 4 illustrates a mode of operation in which derivative footprints used to calculate derivative information for a primitive correspond to screen-aligned quads.

FIG. 4 is a diagram of a triangle 450 and exemplary pixels oriented with respect to a screen format having an origin (0, 0) and pixel positions referenced to horizontal and vertical axes. In this example pixel processing unit 300 utilizes a screen-aligned derivative footprint of a quad of four pixels to calculate texture derivatives. The major bold lines correspond to quad groups of four pixels such that FIG. 4 illustrates sixteen screen aligned quads. Each pixel is further divided into four cells to illustrate the location of pixel centers. The screen aligned quads thus correspond to groups of four pixels defined by bold vertical lines 420, 422, 424, 426 and 428 and bold horizontal lines 430, 432, 434, 436, and 438. In this example the rule for calculating texture derivatives is that every interior pixel 401, 402, 403, 404, 405, 406, 407, 408, 409, 410, 411, 412, 413, and 414 having a pixel center within triangle 450 calculates texture derivatives based on the screen aligned quad that contains the pixel that is being shaded. An additional ten pixels, pixels 451 to 460, lie outside of triangle 350 but must also be rendered as part of the screen-aligned quads used to calculate derivatives for interior pixels. For example, derivatives for pixel 401 are calculated from a screen aligned derivative footprint 480 (illustrated by dashed lines) that is a quad including exterior pixels 451, 452, and 457; derivatives for pixel 414 are calculated from a screen aligned derivative footprint 490 (illustrated by dashed lines) that is a quad including pixels 413, 459, and 460. In this example, twenty-four pixels have to be rendered in order to shade a triangle having fourteen pixels.

Figure 5:
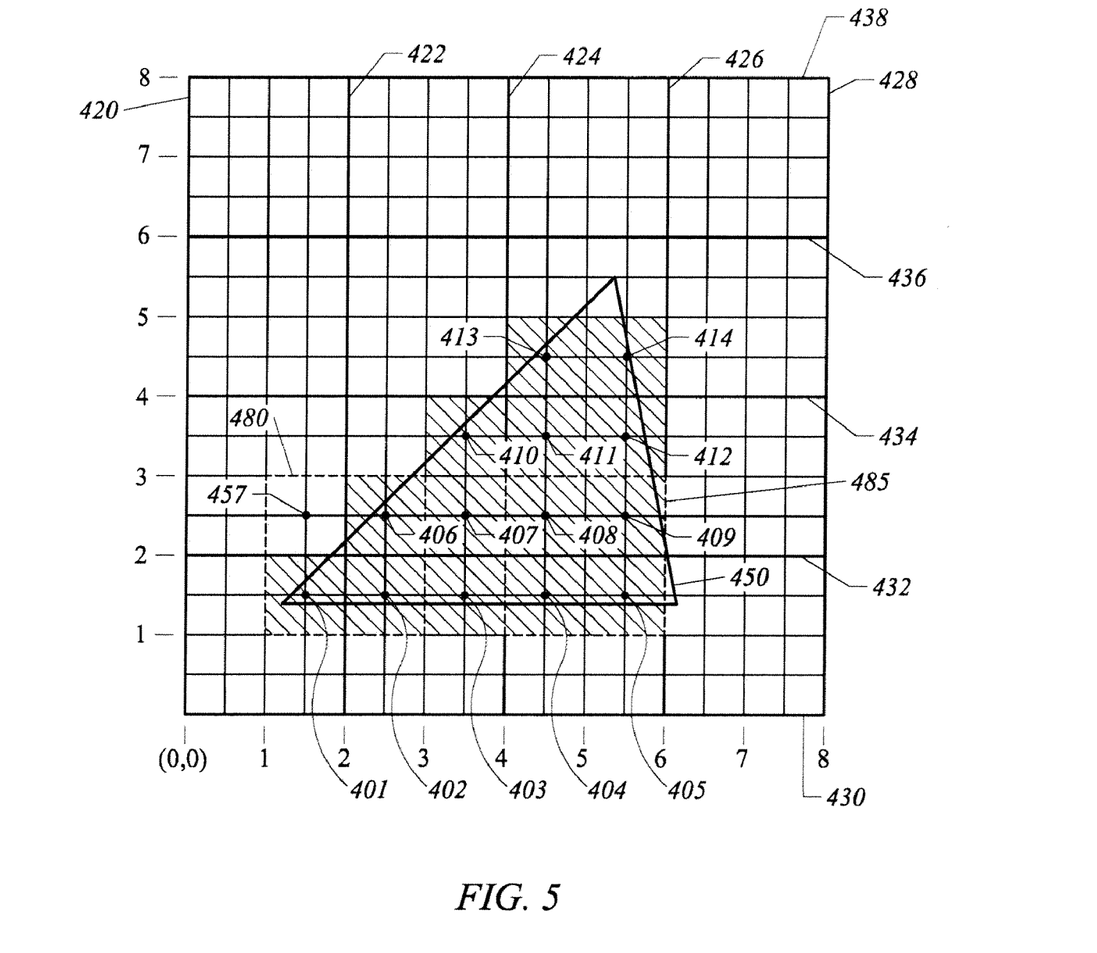
FIG. 5 illustrates a mode of operation in which derivative footprints used to calculate derivative information for a primitive correspond to quads which are aligned to reduce the number of exterior pixels required to generate derivative information for interior pixels.

FIG. 5 illustrates an example of a non-screen aligned mode of operation for triangle 450. In this example, the centers of the derivative footprints (e.g. quads) are shifted to an alignment selected to reduce the number of exterior pixels that must be calculated solely to generate derivative information for interior pixels. For example, an individual derivative footprint may be centered on odd pixels or even pixels in the (x, y) coordinates. Exemplary derivative footprints 480 and 485 are quads, as indicated by dashed lines. In this example, shifting to a non-screen aligned mode of operation requires rendering only one additional exterior pixel 457 to generate derivative information. The non-screen alignment format may, for example, include rules that define the centers of derivative footprints based on the relative positions of the edges of triangle 450 with respect to horizontal and vertical screen aligned quad lines 430 to 438 and 420 to 428. Alternatively, an algorithm may be performed to compare different derivative footprint alignments and then select the one requiring the least computation of exterior pixels.

Referring back to FIG. 3, pixel processing unit 300 identifies pairs of primitives which can be shaded concurrently to reduce texture derivative computations. In one embodiment multi-triangle raster support module 350 rasterizes groups of neighboring pairs of triangles. As an illustrative example, multi-triangle raster support module 350 may detect that mesh primitives are being generated or that tessellation is being utilized. In one implementation, the output of multi-triangle raster support module 350 is pixels of neighboring triangles which are rasterized at the same time. Alternatively, multi-triangle raster support module 350 may work cooperatively with raster 320. Multi-triangle raster support module 350 may, for example, identify neighboring triangles from the same graphical surface according to one or more rules. Multi-triangle coalesce module 340 coalesces pixels (e.g., tiles, such as quad tiles) of neighboring primitives into a single group of pixels. The coalescing process is required to make sure that neighboring primitives are received in pixel shader 330 for concurrent shading.

Figure 6:
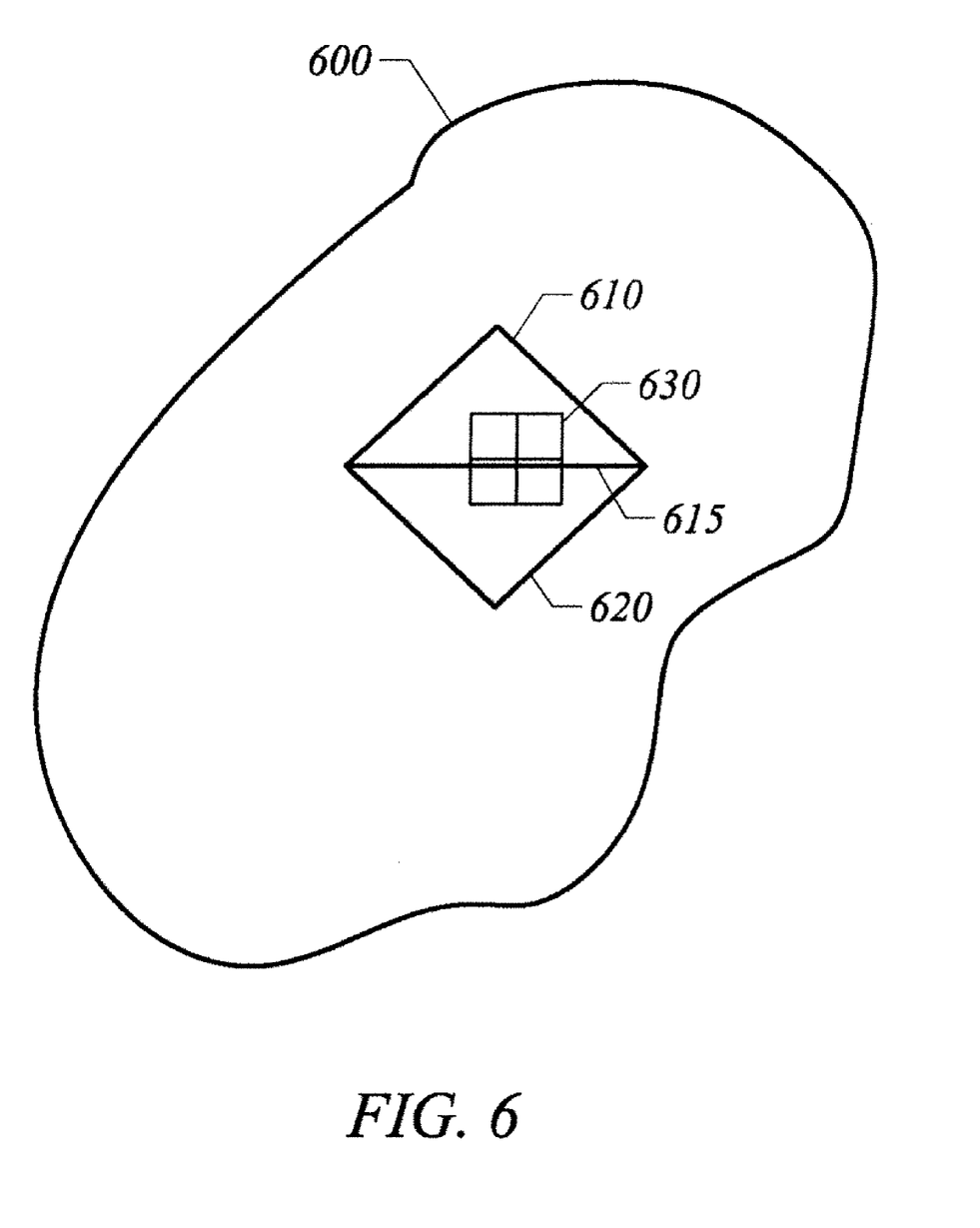
FIG. 6 illustrates the coalescing of pairs of primitives from the same graphical surface for concurrent shading such that derivative footprints straddle a common boundary.

Referring to FIG. 6, adjacent primitives 610 and 620 are coalesced and come from the same graphical surface 600 and share a common boundary 615. A derivative footprint, such as a quad 630, straddles common boundary 615. Consequently, edge pixels in one primitive, such as primitive 620, have a derivative footprint that extends across the boundary 630 into adjacent primitive 610. Both primitives 610 and 620 are concurrently shaded with the pixel data retained for a sufficient length of time such that pixels rendered for one primitive may be used to calculate derivatives for the other primitive and vice-versa. As a consequence, the number of pixels that must be rendered solely to generate derivative information is reduced.

One or more rules may be used by pixel processing unit 300 to identify pairs of primitives 610 and 620 having attributes that make it likely that pixels rendered for one primitive, such as primitive 610, may be used to calculate derivative information for adjacent primitive 620. For example, the pair of primitives 610 and 620 preferably face in the same direction, i.e., are front-facing. Primitives 610 and 620 are also preferably atomic primitives that cannot be subdivided. As an illustrative example, primitives 610 and 620 may be mesh primitives or come from a surface tessellated on-chip. Note that pixel processing unit 300 may receive an instruction from software indicating that the surface to be shaded is a mesh primitive or a tessellated surface.

Figure 7:
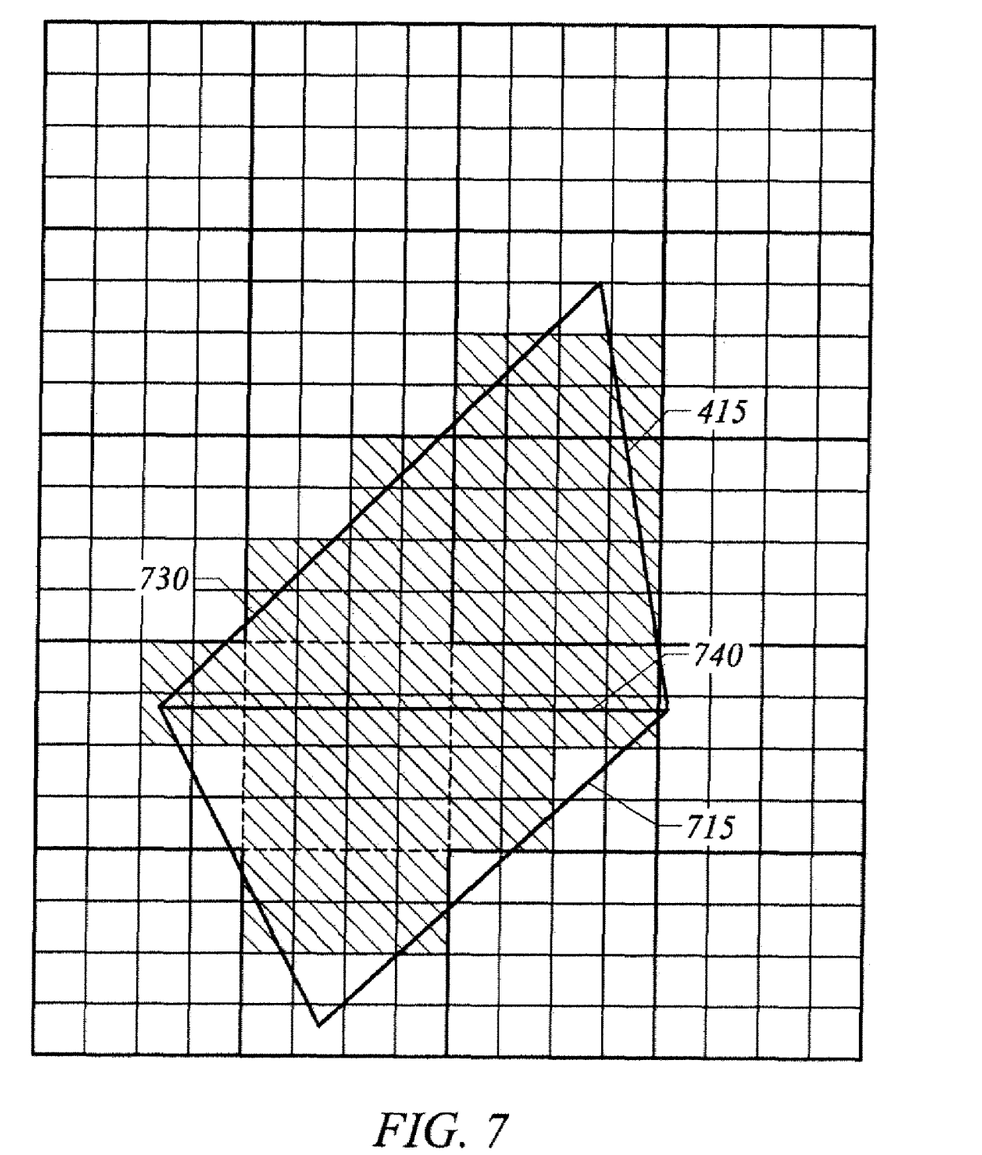
FIG. 7 illustrates a second example of the coalescing of pairs of primitives from a common graphical surface for current shading such that derivative footprints straddle a common boundary.

FIG. 7 illustrates another example of two primitives 415 and 715 that are identified as belonging to the same graphical surface and which are coalesced for concurrent shading. In this example, the larger graphical surface from which primitives 415 and 715 originate is omitted and the primitives 415 and 715 are illustrated against a screen space. An exemplary quad derivative footprint 730 straddling the common boundary 740 is illustrated. The quad derivative footprint 730 is computed using pixels from the neighboring triangle(s). By comparing FIG. 7 and FIG. 4 it can be understood that the coalescing of pairs of primitives reduces the number of pixels that must be calculated solely for the purpose of generating derivative information.

It will be understood that in one embodiment that pixel processing unit 300 performs both footprint realignment and primitive coalescing of adjacent neighboring primitives to reduce the computational effort to calculate texture derivatives. It will also be understood for the case of small triangles that a derivative footprint may extend over more than two primitives generated from the same surface. For example, three triangles may share a common vertex such that a derivative footprint corresponding to a quad may overlap three triangles. Thus, while a minimum number of triangles required for coalescing is two (i.e., a pair) more generally groups of two or more triangles from the same surface may be coalesced to extend the benefits of concurrently shading neighboring primitives and utilizing pixels rendered for one primitive to generate derivative information for another primitive.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A pixel processing apparatus, comprising:
a pixel shader operative to shade pixels of primitives, said pixel shader performing at least one pixel shading operation in which each pixel of a selected primitive that is shaded requires filtering information, the filtering information using an estimate of texture coordinate derivatives based on differences in values with neighboring pixels within a group footprint of neighboring pixels about a pixel being shaded, each group footprint comprising a plurality of pixels; and
said pixel processing apparatus having a mode of operation in which a shading process is organized to reduce the number of pixels in each said group footprint extending outside of the selected primitive that must be rendered for the sole purpose of generating estimates of texture coordinate derivatives for pixels having a pixel center interior to said selected primitive;
the shading process having at least two different group footprint alignments of pixel centers of the group footprint, the shading process reducing the number of pixels exterior to the selected primitive that must be rendered for generating texture coordinate derivatives by comparing the number of exterior pixels required to calculate texture coordinate derivatives for each of said at least two different group footprint alignments and selecting an alignment that minimizes the number of pixels exterior to said selected primitive that must be rendered to generate filtering information.

2. The pixel processing apparatus of claim 1, wherein said group footprint is not screen aligned.

3. The pixel processing apparatus of claim 2, wherein said group footprint is a quad group of four pixels.

4. The pixel processing apparatus of claim 1, wherein said pixel processing apparatus selects an alignment of said group footprint to be centered to either an odd pixel or an even pixel with respect to a horizontal axis and a vertical axis.

5. The pixel processing apparatus of claim 1, wherein said pixel processing apparatus identifies pairs of primitives belonging to a common graphical surface sharing a common boundary for concurrent processing as a coalesced group; said graphics system utilizing at least one pixel rendered for a first primitive on one side of said common boundary for use in a group footprint to calculate estimates of texture coordinate derivatives for at least one pixel of a second primitive on the other side of said common boundary.

6. The pixel processing apparatus of claim 5, wherein at least one group footprint straddles said common boundary.

7. The pixel processing apparatus of claim 6, wherein said group footprint is a quad group of four pixels.

8. The pixel processing apparatus of claim 5, wherein said pairs of primitives are pairs of triangles from mesh primitives.

9. The pixel processing apparatus of claim 5, wherein said pairs of primitives are pairs of triangles from a surface tesselated on-chip.

10. The pixel processing apparatus of claim 5, wherein said pairs of primitives face the same direction.

11. The pixel processing apparatus of claim 5, wherein each primitive of said pair of primitives is an atomic primitive that cannot be subdivided into smaller primitives.

12. The pixel processing apparatus of claim 1, wherein said pixel processing apparatus further comprises:
   a raster stage to rasterize primitives;
   a raster support module to identify neighboring primitives generated from the same graphical surface; and
   a coalesce module to coalesce pixels rasterized for adjacent primitives.

13. A pixel processing apparatus, comprising:
   a raster stage to rasterize primitives;
   a pixel shader operative to shade pixels of primitives, said pixel shader performing at least one pixel shading operation in which each pixel of a selected primitive that is shaded requires filtering information, the filtering information using an estimate of texture coordinate derivatives based on differences in values with neighboring pixels within a group footprint of neighboring pixels about a pixel being shaded to be rendered, each group footprint comprising a plurality of pixels; and
   a derivative footprint module to select an alignment of group footprints used to calculate texture coordinate derivatives about individual pixels interior to a primitive from at least two different group footprint alignments of pixel centers of the groups of pixels used to calculate texture coordinate derivatives, the selection of the alignment affecting the ratio of interior pixels to exterior pixels required to calculate texture coordinate derivatives for individual pixels;
   said processing apparatus having a mode of operation in which said derivative footprint module compares the number of exterior pixels required to calculate texture coordinate derivatives for each of said at least two different group footprint alignments and selects an alignment of said group footprints that minimizes the number of pixels exterior to said selected primitive that must be rendered to generate filtering information.

14. The pixel processing apparatus of claim 13, wherein said derivative footprint module determines whether an alignment of said pixel group footprints on even pixels requires a different computational effort than an alignment on odd pixels and selects an alignment of said pixel group footprints to be centered on either even pixels or on odd pixels along a horizontal axis and a vertical axis to reduce the computational effort required to calculate texture coordinate derivatives for interior pixels.

* * * * *